Nov. 27, 1962     T. E. PIAZZE     3,065,839
CONTAINER FILLING AND CLOSING MACHINE CONVEYOR
Original Filed May 20, 1957     3 Sheets-Sheet 1
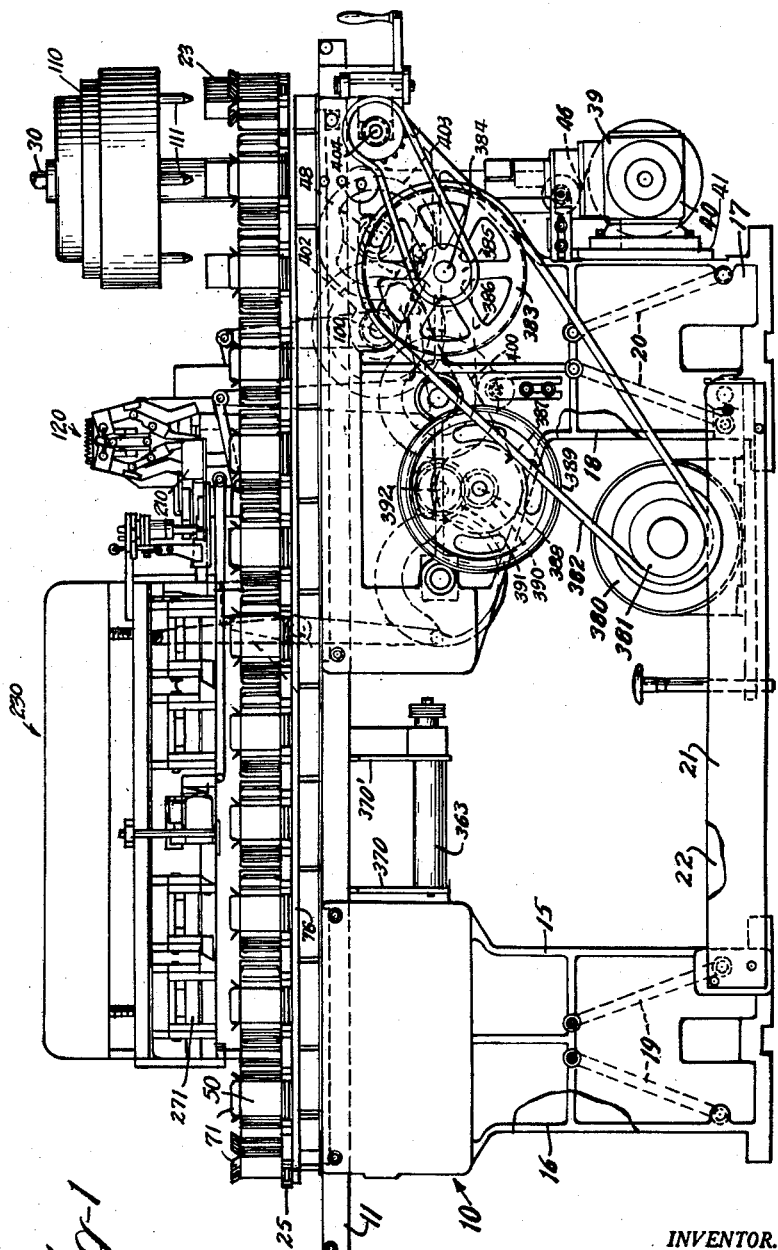

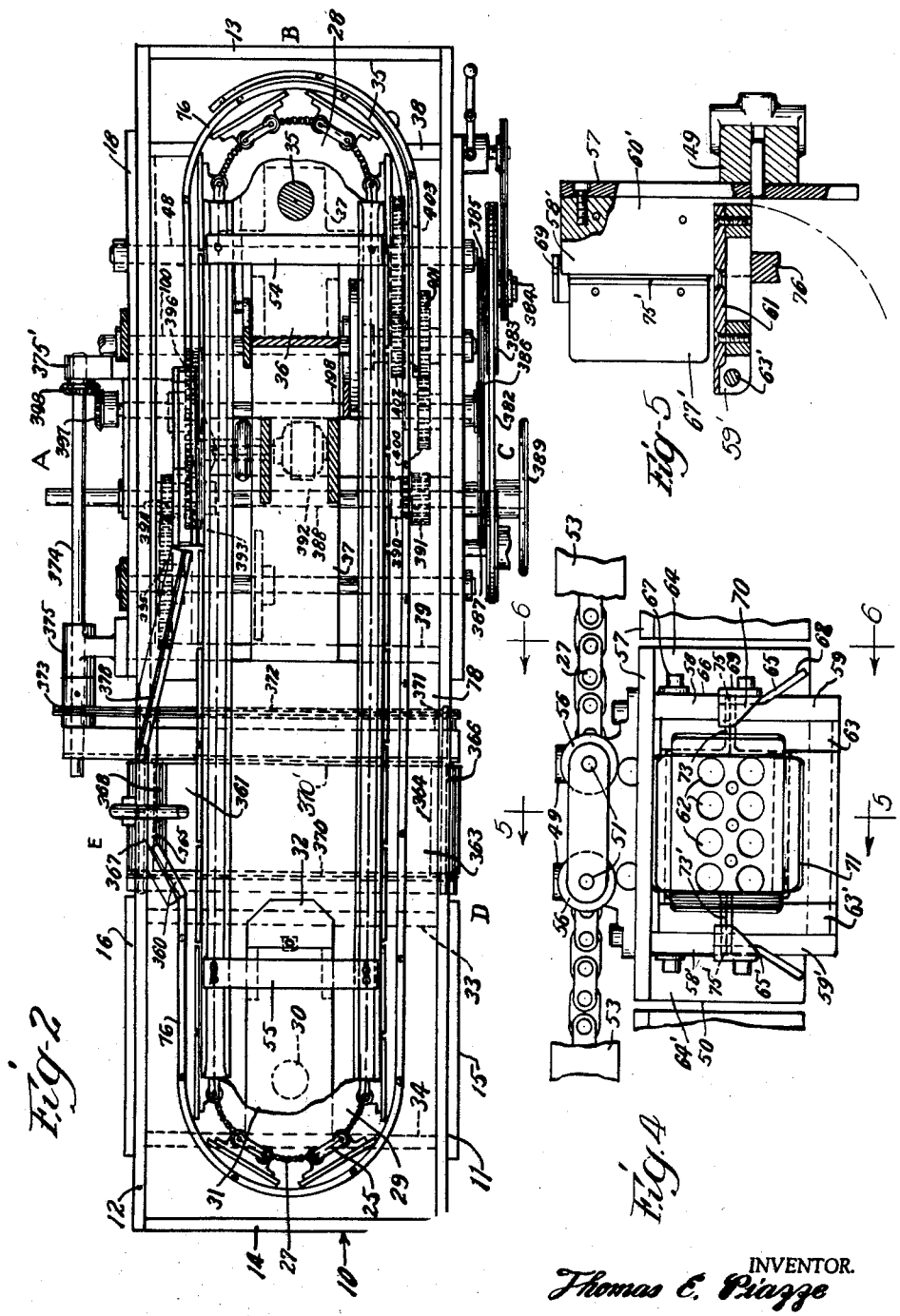

Nov. 27, 1962 T. E. PIAZZE 3,065,839
CONTAINER FILLING AND CLOSING MACHINE CONVEYOR
Original Filed May 20, 1957 3 Sheets-Sheet 3
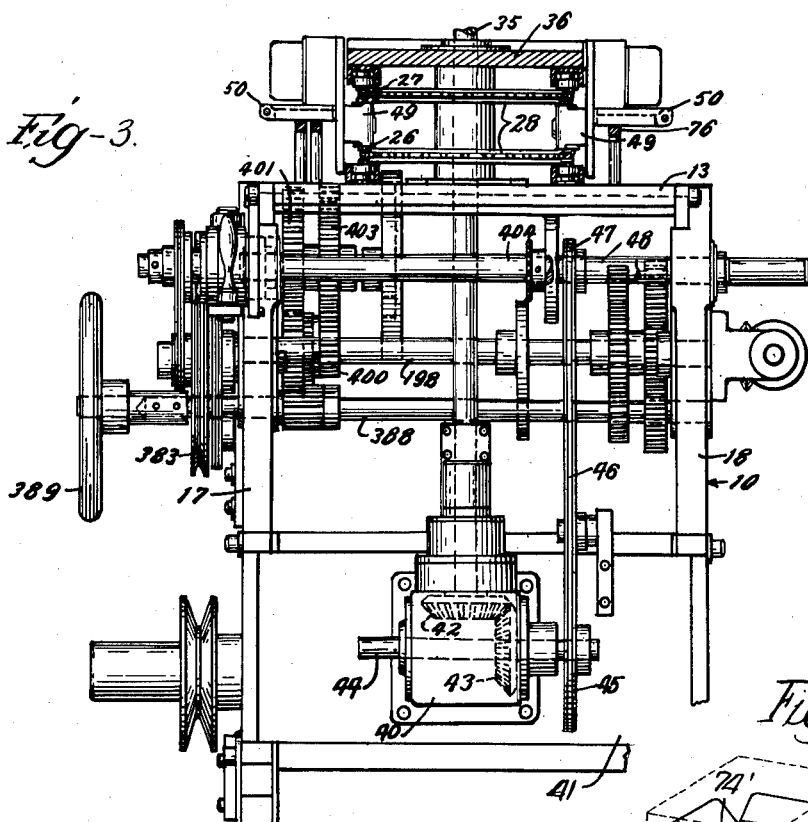
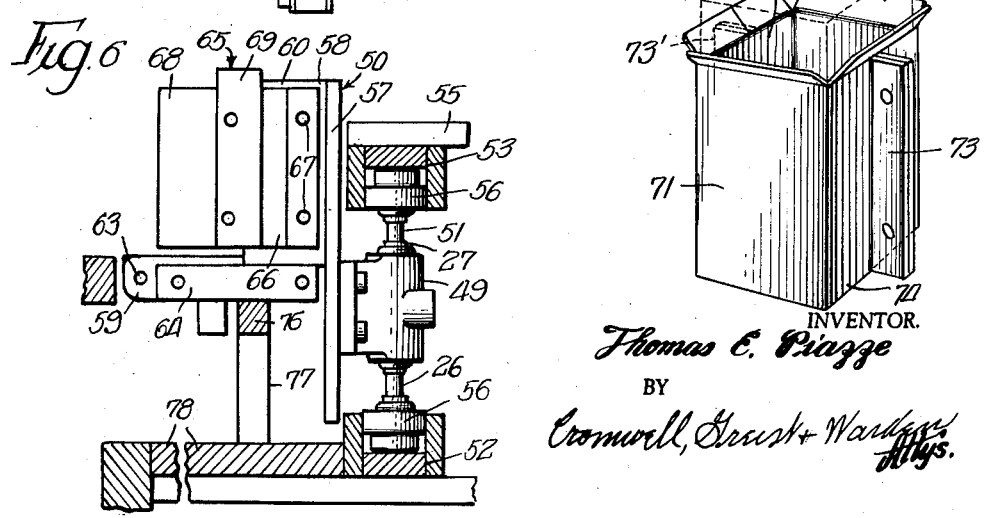
INVENTOR.
Thomas E. Piazze
BY
Cromwell, Greist + Warden
Attys.

United States Patent Office 3,065,839
Patented Nov. 27, 1962

3,065,839
CONTAINER FILLING AND CLOSING MACHINE CONVEYOR
Thomas E. Piazze, Mount Vernon, Ohio, assignor to Continental Can Company, Inc., New York, N.Y., a corporation of New York
Original application May 20, 1957, Ser. No. 660,299. Divided and this application Dec. 23, 1959, Ser. No. 861,577
5 Claims. (Cl. 198—20)

This invention relates to packaging machines and is more particularly concerned with the improvements in a machine for receiving a container formed of pliable sheet material from a container forming machine, filling the container with a commodity, closing the top of the filled container and sealing the same.

This application is a division of my copending application Serial No. 660,299, filed May 20, 1957, now Patent No. 2,952,959, dated September 20, 1960.

It is a general object of the invention to provide a continuously operating machine having a pocketed conveyor for receiving open topped tube-like containers of pliable heat sealable material from a container making machine and for advancing the containers beneath successive mechanisms positioned along the path of the conveyor for filling each container with a predetermined quantity of merchandise, for tucking the upstanding top portions of the end walls of the container while bringing the top portion of the side walls into juxtaposed relation to form a flat closure, and for heat sealing the closed top.

It is a more specific object of the invention to provide a container filling and closing machine comprising a continuously operated conveyor having a series of removable pocket forming mandrels for receiving in upright open position flat bottom bags formed from heat sealable material, the conveyor being arranged to operate in a horizontal plane and to advance the bags successively beneath a device for filling each bag with merchandise, a top closing mechanism, a mechanism for heat-sealing the bag top, and mechanism for discharging the filled and closed bags from the machine.

A further object of the invention is to provide a method of discharging containers from continuously moving receptacles on a conveyor which comprises temporarily removing the bottoms of the receptacles at a discharge station and allowing the containers to drop by gravity to a delivery conveyor.

These and other objects of the invention will be apparent from a consideration of the mechanism which is shown by way of illustration in the accompanying drawings wherein:

FIGURE 1 is a side elevation of a mechanism which embodies the principal features of the invention;

FIGURE 2 is a plan view of the mechanism with portions removed or broken away;

FIGURE 3 is an elevation, to an enlarged scale, of the filling end of the mechanism with the filling device omitted and with other portions broken away;

FIGURE 4 is a plan view, to an enlarged scale, of a portion of the conveyor showing one of the bag supporting assemblies;

FIGURE 5 is a cross section on the line 5—5 of FIGURE 4;

FIGURE 6 is a cross section on the line 6—6 of FIGURE 4; and

FIGURE 7 is a perspective view of one of the pocket forming mandrels removed from the conveyor.

Referring to the drawings, there is illustrated a machine for filling and closing a container of the square bottom type which is formed of heat sealable sheet or web material and which is delivered to the machine in squared up or opened condition. The machine is particularly adapted for use with a container fabricating machine of the type which is disclosed in my copending application, Serial No. 657,853, filed May 8, 1957, now Patent No. 2,942,529.

The machine illustrated in the drawings includes a continuously driven endless conveyor supported on a frame structure for movement in a horizontal plane and provided with a series of upwardly opening pocket forming mandrels in which the flat bottom containers or bags are adapted to be received from the container fabricating machine. A bag feeding mechanism is arranged at a station along the conveyor for delivering successive pairs of the bags in upwardly open relation into the mandrel pockets on the endless conveyor. At successive stations a filling mechanism, and a combination heat sealing and fold forming mechanism are arranged. The closed and sealed bag is then moved by the conveyor to a discharge station where the completed package is dropped through the bottom of the mandrel in which it is carried to a discharge conveyor which delivers it from the machine.

In describing the machine, the side thereof which is shown in FIGURE 1 will be referred to as the front side of the machine while the opposite side will be referred to as the rear side. The bag carrying conveyor travels from left to right along the back run thereof as shown in FIGURE 2 with the empty bags being delivered to the machine at a station indicated at A adjacent one end of the rear side thereof. The bags are filled at the end of the machine indicated as station B. The bag top folding and tucking mechanism is at station C. The heat sealing mechanism is at station D and the completed packages are delivered to the discharge conveyor at station E.

The machine comprises a generally rectangular upright supporting structure 10 (FIGURES 1 to 3) with a top frame comprising side rails 11 and 12 and end rails 13 and 14 with transversely extending brace members which will be hereinafter referred to. The top frame is supported on base forming upright side plate members 15 and 16 at one end of the machine and 17 and 18 at the other end of the machine. The base members 15, 16 and 17, 18 are tied together near the bottom by pairs of transversely extending reinforcing plates 19 and 20, respectively. The pairs of plate members 15, 17 and 16, 18 at each side of the machine are tied together by longitudinally extending bottom side brace rails 21 and 22, respectively.

Mechanism for supporting and carrying the bags 23 (FIGURES 1 to 7) is provided with comprises a bag carrying and supporting conveyor 25 which is mounted on the top frame of the supporting structure 10 for movement in a horizontal plane. The conveyor 25 comprises a pair of vertically spaced endless chains 26 and 27 (FIGURES 2 and 3) which are supported on paired vertically spaced sprockets 28 and 29 mounted at opposite ends of the supporting structure 10. The sprockets 29, at the end of the machine adjacent stations D and E, are mounted on a relatively short, vertically extending stub shaft 30 which is journaled in vertically spaced horizontal top and bottom supporting plate members 31 and 32, which plate members are mounted in longitudinally extending relation with the bottom plate member 32 secured on the longitudinally spaced cross frame members 33 and 34 extending between the side rails 11 and 12, and with the top plate member 31 constituting a part of an upstanding subframe. The stub shaft 30 is an idler shaft and its mounting structure including the plates 31 and 32 is supported for adjustment longitudinally of the supporting frame structure 10 to maintain proper tension in the chains. The sprockets 28 at the other end of the conveyor adjacent the station B are supported on a vertically extending drive shaft 35 which is journaled in vertically spaced horizontal top and bottom supporting plate members 36 and 37. The bottom plate member 37 extends longitudinally approximately half the length of the supporting frame structure 10 and is mounted on longitudinally spaced cross frame bars 38 and 39 which extend between the top frame side members 11 and 12. The top support plate 36 constitutes the top member of an upstanding subframe mounted on the outer end of the plate 37.

The vertical drive shaft 35 (FIGURE 3) depends from the bottom support plate 37 to a gear box 40 which is mounted on a vertical cross plate 41 extending between the side frame members 17 and 18 at the filling end of the machine. The shaft 35 carries a bevel gear 42 on its lower end which is in engagement with a cooperating bevel gear 43 on a relatively short driven cross shaft 44 which is journaled in the vertical side walls of the gear box 40 and which carries on one end a drive sprocket 45 with the latter connected by a drive chain 46 with the sprocket 47 on the cross shaft 48. The cross shaft 48 extends between upper portions of the side frame members 17 and 18 and forms a combination cam and drive shaft.

The conveyor chains 26 and 27 are held in vertically spaced relation by pairs of brackets 49 which extend in spaced relation along the conveyor 25 and which carry pocket forming mandrel supporting assemblies 50 (FIGURES 1 and 4 to 7). The brackets 49 of each pair thereof are connected to the chains 26 and 27 by link connecting vertical pivot pins 51. The chains 26 and 27 are supported and guided in vertically spaced channel-like guide formations 52 and 53. The bottom guide formation 52 is supported on the cross frame members 33, 34, 38, 39 and the upper guideway formation 53 is supported on cross bars 54 and 55 (FIGURE 2) at opposite ends of the machine which are mounted on the subframes supporting the conveyor sprockets. The pivot pins 51 on which the brackets 49 are supported are extended at opposite ends beyond the chain links and provided with guide or bearing rollers 56 which engage in the channels 52 and 53 and hold the mandrel assemblies 50 in upright position.

Each of the pocket forming mandrel supporting assemblies 50 (FIGURES 4 to 6) comprises a vertically extending back or base plate 57 which is attached to the bracket members 49 and extends in a vertical plane outside of the guide channels 52 and 53 projecting slightly above the uppermost guide channel 53. The back plate 57 carries an outwardly extending frame formation which comprises spaced vertical side plates 58, 58' of generally L-shaped configuration with the bottom legs 59, 59' extending outwardly of the vertical portions 60, 60' and back plate 57 and forming side supports for a bottom forming plate 61 which is apertured at 62 and which is swingably mounted on the pivots 63, 63' between the outer ends of the legs 59, 59' so that it may swing downwardly and outwardly away from the back plate 57 as indicated in FIGURE 5. Bottom brace blocks 64, 64' are secured outside the bottom legs 59, 59' and identical spring clamp devices 65, 65' are attached to each of the vertical portions 60, 60' of the side plates 58, 58'. The clamp device 65 comprises a relatively thin spring plate 66 which is secured along one vertical edge to the vertical portion 60 of the side plate 58 adjacent the back edge by bolts 67 and extends beyond the outer edge thereof where it is attached to the inner edge of an outwardly flared plate member 68 and to a vertical plate member 69 having an inturned top flange 70. The clamp device 65' has corresponding members which are indicated by the same numbers primed. The spring plates 66, 66' enable the outwardly flared plates 68, 68' at the open side of the assembly 50 to be spread apart to receive a removable bag receiving and supporting mandrel 71, one of which is shown in FIGURE 7.

The mandrels 71 may be conveniently formed by shaping two plate sections as shown and joining them to form an open ended tubular member of rectangular cross section having outwardly flared flanges 72 at the top end and outwardly directed vertical fins 73, 73' extend from the oppositely disposed side walls 74, 74' and are adapted to be received in the pockets 75, 75' formed between the inner edges of the outwardly flared entrance plates 68, 68' of the clamp devices 65, 65' and the outer edges of the vertical portions 60, 60' of the side plates 58, 58' of the assembly 50 with the open bottom end of the mandrel 71 being seated on the bottom plate 61 and over the perforations 62 therein. The mandrels 71 may be interchanged with any of the assemblies 50 and different size mandrels 71 may be provided for varying the size of the bag which the machine will accommodate. The mandrels 71 may be varied in length and width with the overall dimension in the plane of the fins 73 remaining constant so that the mandrels may be properly seated and held in the supporting assemblies 50.

Additional support is provided for maintaining the assemblies 50 in proper upright position which comprises a supporting rail 76 (FIGURES 2, 3 and 6) extending along the conveyor 25 beneath the path of movement of the assemblies 50 at all points except at the empty bag receiving station A and the finished package discharge station E. The rail 76 is mounted on a series of upright post members 77 which are spaced along the same and extend upwardly from two plate members 78 which are supported on the cross frame bars 33, 34, 38 and 39 adjacent the side and end members 12, 13, 14 and 15 of the top frame.

The empty bags are supplied to the pocket forming mandrels 71 in pairs from a suitable source, preferably an intermittently operating duplex bag making machine associated with the present apparaus such as disclosed in my Patent No. 2,942,529. The bags 23 are delivered to the conveyor 25 at the station indicated at A in FIGURE 2 through a transfer chute mechanism (not shown).

After the bags 23 are received in the pocket forming mandrels 71, they are advanced by movement of the conveyor 25 around the filling end of the machine where a predetermined quanity of a commodity is deposited in each of the bags by a rotary head filling mechanism 110 which carries a series of filling nozzles 111 and which is supported on and rotates with the upstanding shaft 35. The filling mechanism 110 is of the type which delivers successive measured charges through the nozzles 111 as the mechanism rotates about its supporting shaft, the nozzles 111 being aligned with the mandrels 71 on the conveyor 25.

As the filled bags are advanced beyond the filling station B they are moved to a tucking head mechanism 120 which is mounted on the supporting structure 10 at station C and which operates to place tucks or bellows folds in the top marginal portions of the end walls of each filled bag as it moves beneath the tucking head at the station C. After the top of the bag is tucked at station C, it is advanced to a top folding and sealing mechanism 230 at station D. The tucking head 120, the sealing mechanism 230 and associated mechanism now described in detail in the parent application, now Patent No. 2,952,959.

After a bag is completely closed and sealed it moves around the end of the machine on the conveyor 25 to the discharge station E (FIGURE 2) where the supporting rail 76 beneath the bag supporting assembly 50 is interrupted and the pivoted bottom 61 of each assembly 50 rides downwardly to open position on an outwardly angled cam forming member 360. An opening 361 in the horizontal frame plate 78 at station E permits each successive bag to be dropped through the open bottom of the mandrel and its supporting assembly and to be discharged onto the upper run of a belt delivery conveyor 363 which extends transversely of the machine. The conveyor 363 is supported at its opposite ends on the rollers 364 and 365, the latter being mounted on spaced shafts 366 and 367 beneath the top frame 11 of the machine. A guide plate 368 directs the filled bag onto the conveyor and spaced side guide plates 370, 370' are provided for insuring that the completed packages will be delivered at the front sdie of the conveyor. The forward supporting shaft 366 of the conveyor 363 is extended at one end and carries a sprocket 371 connected by a drive chain 372 with a sprocket 373 on a longitudinally extending drive shaft 374 which is mounted in spaced bearings 375, 375' at the rear of the machine. A cam plate 378 extends from the leading side of the discharge aperture 361 which swings the pivoted bottom 61 of each mandrel support 50 back into horizontal position before the mandrel reaches the bag receiving station A.

The machine is powered by a motor 380 (FIGURE 1) having a drive pulley 381 which is connected by belt 382 with a pulley 383 on the stub shaft 384. The shaft 384 carries a sprocket 385 which is connected by the drive chain 386 with a sprocket 387 on the main drive shaft 388, the latter extending transversely across the machine and having a hand wheel 389 on one end. The drive shaft 388 has a pinion 390 inside the main frame member 17 and which is connected in driving relation with a gear 391 on the cross shaft 392. At its opposite end inside the frame member 18 the shaft 392 carries pinions 393 and 394 which engage in driving relation with gears 395 and 396 on the cross shafts 308 and 198, respectively. The cross shaft 198 extends beyond the rear face of support member 18 and carr es a bevel bear 397 which engages in driving relation with a bevel gear 398 on the horizontal drive shaft 374. At its other end the cross shaft 198 carries inside the frame member 17 a pinion 400 which engages in driving relation with a gear 401 on the cross shaft 100. The cross shaft 100 has a pinion 402 adjacent the gear 401 which engages in driving relation with gear 403 on the cross shaft 48 which drives the vertical drive shaft 35.

I claim:

1. In a bag filling and closing machine having an upright supporting frame structure, a chain conveyor mounted on end sprockets which are supported on longitudinally spaced, vertically extending axes arranged at opposite ends of said frame structure, a series of bag supporting assemblies mounted in spaced relation on said conveyor, said assemblies each comprising an angular supporting bracket having an upright portion attached to the conveyor for horizontal movement and a horizontal portion extending in fixed relation outwardly thereof, said horizontal portion having an aperture and a pivotal section mounted in said aperture and adapted to swing downwardly when unsupported to provide for discharge of a bag in a vertical path through said aperture, means for holding a bag in upright position on said assembly in vertical alignment with said discharge aperture and means on said frame structure for engaging beneath the horizontal portion of said supporting bracket and holding said pivotal section in a horizontal position at predetermined points along said conveyor, said supporting means being interrupted at a bag discharge station to permit said pivotal section to swing into a vertical plane and allow the bag to discharge through the aperture.

2. A bag filling and closing machine having an upright supporting frame structure, a chain conveyor mounted on end sprockets which are supported on spaced vertical axes on said frame structure, a series of bag holding assemblies mounted in spaced relation on said conveyor, said holding assemblies each comprising an angular supporting bracket having an upright leg forming portion attached to the conveyor and a horizontal leg forming portion extending outwardly thereof in relatively fixed relation thereto, said horizontal portion having an opening and a section mounted on a pivot at the outer edge of said opening and adapted to swing downwardly when unsupported to provide for discharge of a bag through said opening, pocket forming means for supporting a bag on each holding assembly in vertical alignment with said discharge opening and means on said frame structure for engaging and supporting said pivotally mounted section in a horizontal position at predetermined points along said conveyor, said supporting means being interrupted at a bag discharge station to permit said pivotal section to swing into a vertical position and allow the bag to discharge through the aperture.

3. In a bag filling and closing machine having an upright supporting frame structure, a chain conveyor mounted on end sprockets supported on longitudinally spaced, vertical axes on said frame structure, a series of bag supporting assemblies mounted in spaced relation on said conveyor, said assemblies each comprising an angular supporting bracket having an upright portion attached to the conveyor and a horizontal portion extending outwardly thereof, said horizontal portion having a bag discharge opening therein and a bag supporting member pivotally mounted in said opening and adapted to swing downwardly when unsupported to provide for discharge of a bag through said opening, a separable tube-like open ended pocket forming mandrel adapted to be positioned in vertically disposed relation on said bracket, spring clamp members on said bracket for retaining said mandrel thereon and a supporting rail at spaced points on said frame structure for engaging beneath said horizontal portion to hold said pivotal section against swinging movement during a predetermined portion of its movement along said conveyor.

4. In a bag handling machine, a supporting frame having an endless chain conveyor mounted thereon for movement in a horizontal plane, a series of bag supporting assemblies mounted in spaced relation along the chain and extending outwardly thereof, said assemblies each having a bottom section which has an opening and is provided with a platform pivoted in said opening for discharge of the bag in a vertical path through the opening, a removable top opening bag holding mandrel seated on said bottom section, and spring clamps for retaining the bag holding mandrel in upright position thereon.

5. In a bag filling and closing machine having an upright supporting frame structure, an endless conveyor mounted for horizontal movement on said frame structure, a series of bag supporting assemblies mounted in spaced relation on said conveyor, said assemblies each comprising a supporting bracket having an upright portion attached to the conveyor and a rigidly connected horizontal portion extending outwardly thereof, which horizontal portion has a bag supporting section pivotally mounted to swing downwardly when unsupported so as to provide for discharge of the bag in a vertical path through said horizontal bracket portion, said bracket having vertically disposed, outwardly extending flange forming members spaced in the direction of movement of the conveyor, spring clamp members mounted on said flange members, a tubular bag mandrel having oppositely disposed, outwardly directed side flange members, said bag mandrel being disposed in upright position above said bag supporting section with its side flange members engaging said spring clamp members, and means on said frame structure for engaging beneath said bag supporting section to hold the same in horizontal position at predetermined points along said conveyor which means is discontinuous so that said bag supporting section is unsupported and free to pivot downwardly at a predetermined discharge point along said conveyor.

(References on following page)

References Cited in the file of this patent

UNITED STATES PATENTS

| | | | |
|---|---|---|---|
| 708,759 | Dodge | Sept. 9, | 1902 |
| 1,791,303 | Ferguson | Feb. 3, | 1931 |
| 1,831,388 | Hippenmeyer | Nov. 10, | 1931 |
| 2,511,714 | Keller | June 13, | 1950 |
| 2,553,683 | Smith | May 22, | 1951 |
| 2,681,727 | Dersch | June 22, | 1954 |
| 2,689,636 | Currivan | Sept. 21, | 1954 |
| 2,732,988 | Feinstein | Jan. 31, | 1956 |
| 2,766,571 | Bryce | Oct. 16, | 1956 |